United States Patent
Hebron et al.

(10) Patent No.: US 10,104,083 B2
(45) Date of Patent: *Oct. 16, 2018

(54) METHOD AND APPARATUS FOR MOCA NETWORK WITH PROTECTED SET-UP

(71) Applicant: MaxLinear, Inc., Carlsbad, CA (US)

(72) Inventors: Yoav Hebron, San Diego, CA (US); Na Chen, San Diego, CA (US); Zong Liang Wu, San Diego, CA (US); Ronald Lee, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 14/808,193

(22) Filed: Jul. 24, 2015

(65) Prior Publication Data
US 2016/0028731 A1 Jan. 28, 2016

Related U.S. Application Data

(60) Provisional application No. 62/028,317, filed on Jul. 24, 2014.

(51) Int. Cl.
*H04L 29/06* (2006.01)
*H04L 12/24* (2006.01)

(52) U.S. Cl.
CPC ............ *H04L 63/10* (2013.01); *H04L 63/083* (2013.01); *H04L 63/20* (2013.01); *H04L 41/0803* (2013.01); *H04L 41/28* (2013.01)

(58) Field of Classification Search
CPC ........ H04L 63/10; H04L 63/20; H04L 63/083
See application file for complete search history.

(56) References Cited

U.S. PATENT DOCUMENTS

2012/0054493 A1* 3/2012 Bradley ................ H04W 8/005
713/171
2012/0174197 A1* 7/2012 Klein ................... H04L 12/2801
726/5

* cited by examiner

*Primary Examiner* — Noura Zoubair
(74) *Attorney, Agent, or Firm* — McAndrews, Held & Malloy, Ltd.

(57) ABSTRACT

Systems and methods for securing a network, for admitting new nodes into an existing network, and/or securely forming a new network. As a non-limiting example, an existing node may be triggered by a user, in response to which the existing node communicates with a network controller node. Thereafter, if a new node attempts to enter the network, and also for example has been triggered by a user, the network controller may determine, based at least in part on parameters within the new node and the network controller, whether the new node can enter the network.

16 Claims, 3 Drawing Sheets

METHOD AND APPARATUS FOR MOCA NETWORK WITH PROTECTED SET-UP

CROSS-REFERENCE TO RELATED APPLICATIONS/INCORPORATION BY REFERENCE

This patent application makes reference to, claims priority to and claims benefit from the U.S. Provisional Patent Application Ser. No. 62/028,317, filed on Jul. 24, 2015, and titled "Method and Apparatus for MoCA Network with Protected Set-Up," the entire contents of which are hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various communication networks, such as for example MoCA networks, lack a method and/or apparatus for securely and reliably adding a new node to the network. Limitations and disadvantages of conventional methods and systems for handling the addition of a new node to a network, for example a MoCA network, will become apparent to one of skill in the art, through comparison of such approaches with some aspects of the present methods and systems set forth in the remainder of this disclosure with reference to the drawings.

SUMMARY

Various aspects of this disclosure provide systems and methods for securing a network, for admitting new nodes into an existing network, and/or securely forming a new network. As a non-limiting example, an existing node may be triggered by a user, in response to which the existing node communicates with a network controller node. Thereafter, if a new node attempts to enter the network, and also for example has been triggered by a user, the network controller may determine, based at least in part on parameters within the new node and the network controller, whether the new node can enter the network.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set { (x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

A premises (e.g., a home, office, campus, etc.) may comprise a communication network for the sharing of information between various devices within the premises. For example, entertainment content may be received through a wide area network (WAN) provided by an MSO (Multi-system Operator), such as a cable television operator or satellite content provider. Content provided to the premises may be distributed throughout the premises over entertainment premises-based network (e.g., a home entertainment network, general premises-based communication network, etc.). The premises-based network may, for example, comprise a local area network (LAN) in any of a variety of configurations, such as a mesh network. An example protocol for establishing a premises-based network, for example a home entertainment LAN, is defined by the well-known MoCA (Multi-media over Coax Alliance) network protocol that is in-use today.

Figure 1:
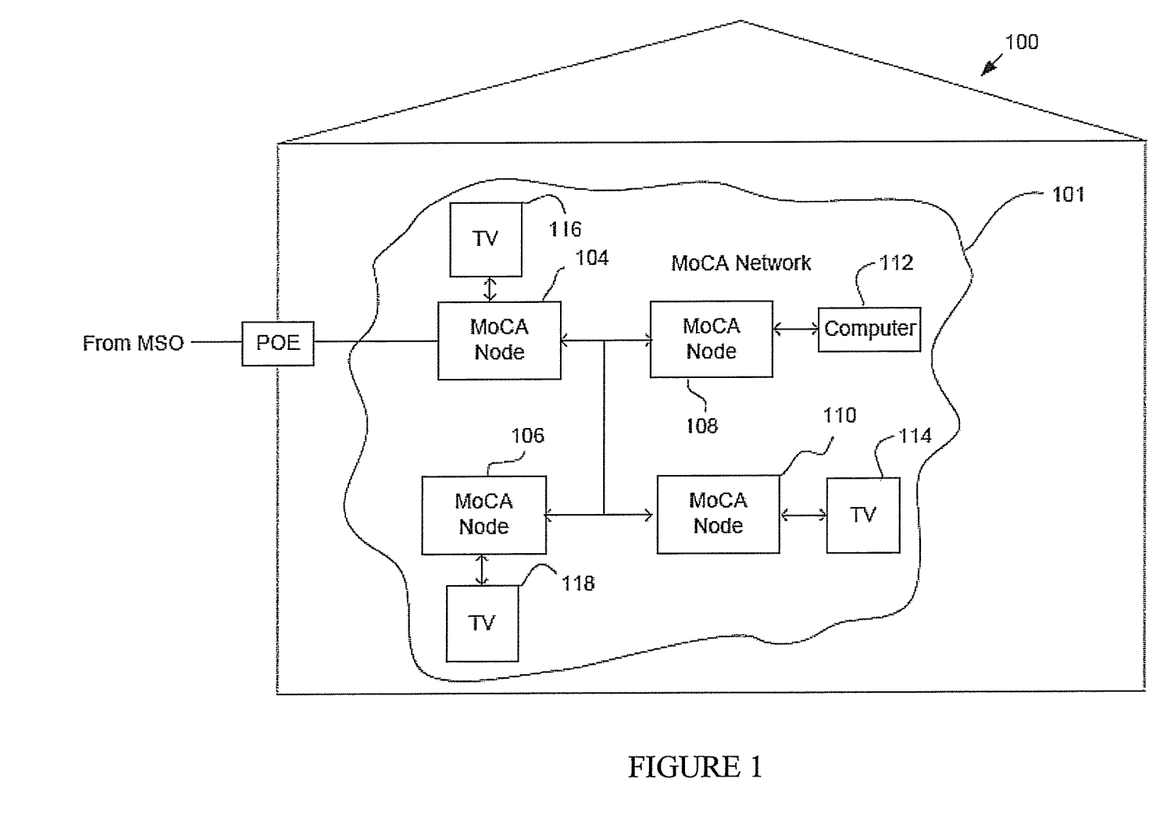
FIG. 1 shows a block diagram of a premises having a MoCA network.

FIG. 1 shows a block diagram of a premises 100 (e.g., a home, office, campus, etc.) having a MoCA network 101. The discussion here will generally provide examples in a MoCA network environment. It should be understood, however, that the scope of this disclosure is not limited to MoCA networks. In the example shown in FIG. 1, the MoCA network 101 receives content from an MSO at a MoCA Point of Entry (POE). The MoCA network 101 enables the content to be communicated to all of the MoCA nodes 104, 106 108, and 110 on the MoCA network 101. In the example shown in FIG. 1, the MoCA nodes 104, 106, 108, and 110 are coupled (e.g., communicatively coupled via any of a variety of types of communication links) to either a television or a computer. For example, the information that is present in the computer 112 can be formatted for and displayed on any of the televisions by sending Prioritized Quality of Service (PQoS) data streams from the computer 112 to one or more of the televisions 114, 116, and 118 via the associated MoCA nodes 104, 106, 108, and 110.

When setting up a premises-based network (e.g., a home entertainment network), network security may be a consideration. For example, in various scenarios, it may be beneficial to ensure that only those devices that are authorized to transmit and receive information over the network can do so. Network security may be accomplished in any of a variety of manners. For example, one way in which security may be maintained within a LAN is to ensure that only devices that have a network password can enter the network. Therefore, in order to gain access to the network, a device must generally gain access first to the password used to secure the network.

One example manner of allowing a new device, sometimes referred to as a New Node (NN) to enter a network is to require that a person who is installing the NN press a button on the NN and also on one of the nodes within the network to which the NN is attempting to gain access. This procedure ensures that only nodes that are being installed by someone who has physical access to at least one node of the network can gain access to the network. Accordingly, a person may press a button (or otherwise cause a trigger to occur, for example via a user interface device, remote control, etc.) within or on the NN. The person may then, for example, be required to walk over to one of the nodes of the network to which access is sought, and press a button (or otherwise cause a trigger to occur) within or on that node. When one of the nodes within the network recognizes that this procedure has been properly followed, one of the nodes of the network may then share the network password with the NN, thus allowing the NN to communicate with the other nodes of the network. Once the NN has the password, it can then gain admission to the network.

For various communication networks, for example MoCA networks and others, a secure manner in which new nodes are added to such networks has either not been established or has been established but is inadequate (e.g., inefficient, non-secure, etc.). Various aspects of the present disclosure thus provide systems and methods for securely adding new nodes to a network (e.g., a premises-based network).

In accordance with various aspects of the present disclosure, a NN can securely gain access to an existing network (e.g., a network for which at least two nodes have previously established communication with one another in accordance with a network protocol). In addition, various aspects of the present disclosure allow a NN to establish a new network with another node in a secure manner, which other nodes can then join, for example in accordance with various aspects of the present disclosure that provide for an NN to securely join an existing network.

In accordance with various aspects of the present disclosure, a NN may be powered on (or, for example, hard reset, etc.). The NN may then enter a listening phase during which the NN attempts to detect a beacon signal. The beacon signal may, for example, come from a network controller node of a previously established network. Also for example, the beacon may come from another node that has not been able to find another node with which to establish a network and is currently seeking a second node with which to form a new network (e.g., a beaconing node). If the NN is triggered by a user prior to detecting a beacon, the NN may, for example, set a $PB_{State}$ flag to "PUSH" indicating that the NN was triggered. The NN may also start a timer or clock (e.g., a walking timer) and continue to search until either the timer expires, the NN detects a beacon, or the NN starts to send beacons (e.g., the listening phase ends). The walking timer is set to time out after the amount of time allotted to walk from one node to another (e.g., to trigger such node) has elapsed.

If the NN detects a beacon prior to the walking time elapsing, then the NN may check whether a $PB_{State}$ flag is set to PUSH (e.g., indicating that a network set-up session is underway, for example a network protected set-up). A beacon may, for example, be sent by a network controller, access point, mesh member, or other type of network node. If the $PB_{State}$ flag is set to PUSH, then the NN may, for example, send a message (e.g., a Pre-Admission Discovery Request) to the node that sent the beacon. The NN may, for example, identify itself and send protected set-up parameters (e.g., MoCA Protected Set-up (MPS) Parameters in a MoCA network scenario) that indicate the privacy status set within the NN. The NN may then, for example, attempt (or wait) to receive a response to the sent message (e.g., wait to receive a Discovery Response in response to a Discovery Request). If the NN receives a response (e.g., a Discovery Response), the response may, for example, comprise protected set-up parameters of the responding node (e.g., MPS Parameters of a MoCA responding node). The NN may then, for example, check the privacy status of the responding node based on the protected set-up parameters received from the responding node and determine whether the two nodes are compatible to continue the process. If compatible, then the NN may, for example, exchange password information with the responding node. A decision may, for example, be made as to whether a password is required to be shared by the NN and the responding node. If so, a further decision may, for example, be made by the NN as to whether the NN provides the password to the responding node or whether the responding node provides the password to the NN. Alternatively, if the NN and the responding node are not compatible, then the attempt to establish a network between the two nodes may fail. In some cases, however, the NN may be able to gain admission to the network without a password exchange.

If the NN fails to detect a beacon within a predetermined amount of time (e.g., a period of time longer then the walk time), the NN may enter beacon phase. Upon entering the beacon phase, the NN may take on the role of a network controller (NC), for example performing beaconing functionality and/or any other functionality associated with a network controller). Accordingly, during beacon phase, the NC (formerly the NN) may transmit beacon signals. If a receiving node is powered on, has been triggered, and detects the beacon signals transmitted by the NC, then the receiving node may transmit a message (e.g., a Pre-Admission Discovery Request in a MoCA scenario). The NC may then send a response (e.g., a Discovery Response in a MoCA scenario) that includes protected set-up parameters of the NC (e.g., MPS Parameters of the NC in a MoCA scenario) and thus indicates the privacy status of the NC. The NC may then decide whether the privacy status of the two nodes is compatible. If so, the NC may further determine whether an exchange of passwords is necessary and/or how such an exchange of passwords is to take place.

In accordance with various aspects of the present disclosure, when an Existing Node (EN) (e.g., a node that is currently a member of a network) is triggered, the EN may ignore the trigger if its management parameter (e.g., $MPS_{EN}$ in a MoCA scenario) is set to DISABLE, or if a state flag (e.g., a $PB_{State}$ flag in a MoCA scenario) is set, indicating that the EN was previously triggered less than a predetermined time ago. However, if triggered and the management parameter (e.g., $MPS_{EN}$) of the EN is set to ENABLE and the state flag (e.g., $PB_{State}$ flag) is not set, then the EN may send a request (e.g., an MPS Request in a MoCA scenario). In a MoCA scenario, the request may, for example, be sent as an Information Element (IE) within a Reservation Request (RR) to the Network Controller (NC) that controls the network to which the EN is a member.

In accordance with various aspects of the present disclosure, in an example MoCA scenario, an NC that receives a RR with a MPS request may check the status of the $PB_{State}$ flag. If the state of the $PB_{State}$ flag is CLEAR, then the $PB_{State}$ flag is set to PUSH. In addition, a register called $PB_{Node}$ is loaded with a value that indicates the identity of the EN that sent the MPS request. A walk timer is then started within the NC. Then, in the next Media Access Plan (MAP), the NC includes a Network MPS Session Protocol IE indicating that the NC received the MPS request and identifying the node that sent the MPS request. If the walk timer times out before a Pre-Admission Discovery Request is received (e.g., from a NN), the MPS session is aborted, the $PB_{State}$ flag is set to CLEAR, and the walk timer is reset. When either the timer expires or the admission of the new node is complete or fails, the NC sends a message indicating that the MPS session has ended.

In accordance with various aspects of the present disclosure, the password exchange may comprise an M1 Request, an M2 Response, an M2 Acknowledge, an M3 Response and an M3 Acknowledge.

Figure 2:
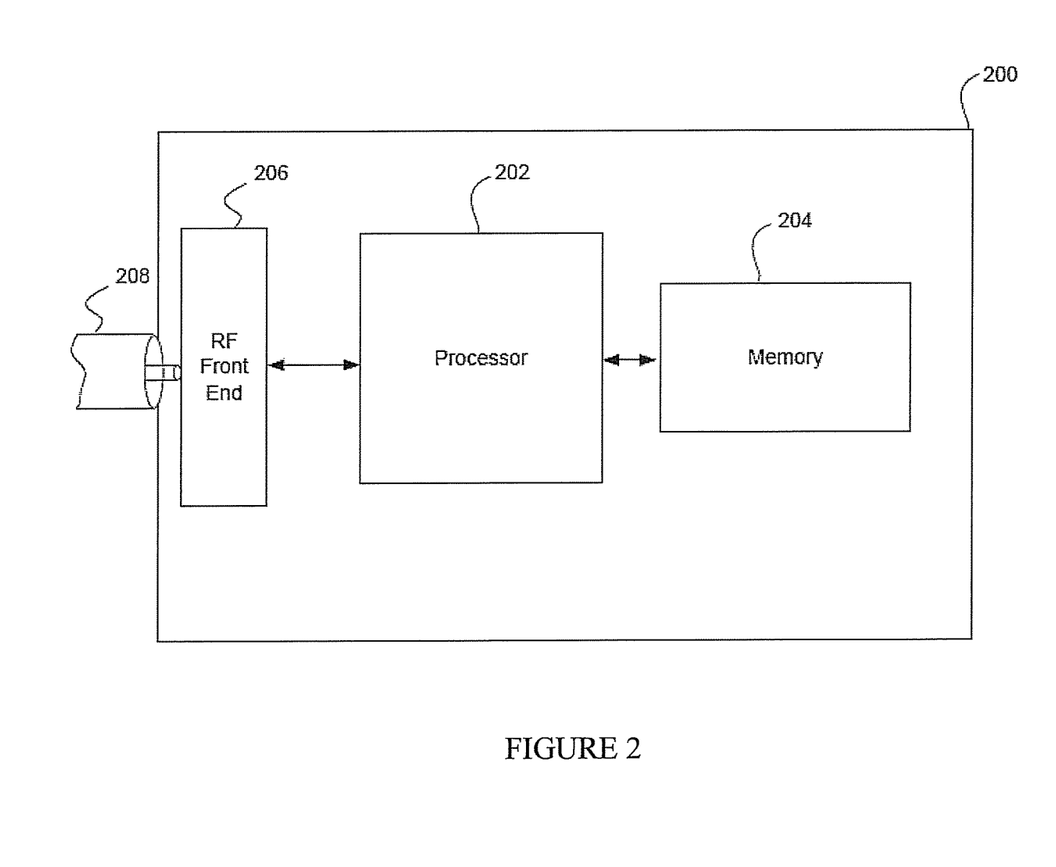
FIG. 2 shows an example block diagram of a network node, in accordance with various aspects of the present disclosure.

FIG. 2 shows an example block diagram of a network node 200, in accordance with various aspects of the present disclosure. The node 200 may, for example, share any or all characteristics with the MoCA nodes 104, 106, 108, and 110 shown in FIG. 1 and discussed herein. The node 200 comprises a processor 202, a memory 204 and a radio frequency (RF) front end 206. In the transmit path, the RF front end 206 receives information from the processor 202. The information is modulated on signals generated by the RF front end 200. The RF front end 206 transmits such signals over a medium 208, such as over coaxial cabling used to connect nodes of a MoCA network. In the receive path, the RF front end 206 also receives signals from the medium 208, demodulates the signals to retrieve the information communicated by such signals, and passes the received information to the processor 202 for processing. It should be understood that, while the example node 200 shown in FIG. 2 is described with respect to a node connected via coaxial cable, the node may be connected to the network over any medium, such as wireless connection, twisted pair, optical fiber or any other medium that can transport signals from node to node.

The processor 202 within the node 200 performs several tasks. The example mode 200 is shown and described as having a single processor 202 that performs all of the disclosed tasks and functions of the node 200. Nonetheless, it should be understood that the disclosed tasks and functions of the node 200 can be performed by any combination of hardware, firmware and software. Furthermore, any software or firmware can be executed by one or a combination of several independent or coordinated processors. For example, in various example implementations, it may be more efficient to use processors dedicated to performing a particular task or group of tasks. Also for example, the processor 202 (or processors) may comprise any of a variety of processing circuits (e.g., general purpose processors, microcontrollers, application-specific integrated circuits, programmable state machine devices, analog and/or digital circuitry, etc.). Such architectural variations are understood. Accordingly, the details of such architectures are not provided herein for the sake of brevity and illustrative clarity.

As mentioned previously, various aspects of the present disclosure may herein be presented in the context of a MoCA network. It should be understood, however, that the scope of this disclosure is not limited to methods and apparatus of a MoCA network.

In accordance various aspects of the present disclosure, the node 200 may perform in one of at least three distinct roles, non-limiting examples of which are provided herein. Furthermore, the particular role taken on by the node 200 may depend upon the tasks the node 200 is performing and the environment in which the node 200 exists. In an example implementation, the node 200 is powered on (e.g., power is initially applied to the node to start the node 200 operating), the node 200 is subjected to a hard reset causing state information to be lost, etc. When initially powered on, the node 200 is unpaired. For example, the node 200 has no affiliation with any network. Also, in accordance with an example implementation, the node 200 may have a number of default settings that are relevant to the disclosed method and apparatus. For example, a privacy setting referred to as $PRIVACY_{EN}$ may be initially set to DISABLED. In addition, there may for example be a plurality of parameters that are associated with the MoCA Protected Set-up (MPS) function of the node 200. Four example parameters comprise:

$MPS_{EN}$: Initialized to ENABLED.
$MPS_{PRIVACY\_RECEIVE}$: Initialized to ENABLED.
$MPS_{PRIVACY\_DOWN}$: Initialized to DISABLED.
$MPS_{WALK\_TIME}$: Initialized to 2 minutes.

Initially, the node 200 may operate in the role of New Node (NN). For example, when the node 200 is initially turned on, it may enter a "Listening Phase". In the Listening Phase, the node 200 may, for example, attempt to detect (or listen for) a beacon signal. For example, the RF front end 206, under the control of the processor 202, may search for a beacon signal transmitted by another node that is operating on the medium 208 to which the node 200 is connected. If the node 200 does not detect a beacon within a predetermined amount of time, the node 200 may then enter a "Beacon Phase". In the Beacon Phase, the node 200 may, for example, transmit beacons for a period of time and listen to see whether another node operating on the medium has detected and responded to the transmitted beacons. The Listening Phase/Beacon Phase sequence may, for example, be repeated multiple times.

Once the node 200 joins a network (e.g., through a process illustrated by example herein), the node 200 operates in the role of Existing Node (EN). In accordance with the various aspects of the present disclosure, at least one node in each network generally assumes the role of Network Controller (NC). The NC may, for example, be responsible for scheduling most or all of the traffic on the network. Additional examples regarding the role of NC are provided herein. In accordance with various aspects of the present disclosure, the node 200 may operate in accordance with the MoCA standard.

Figure 3:
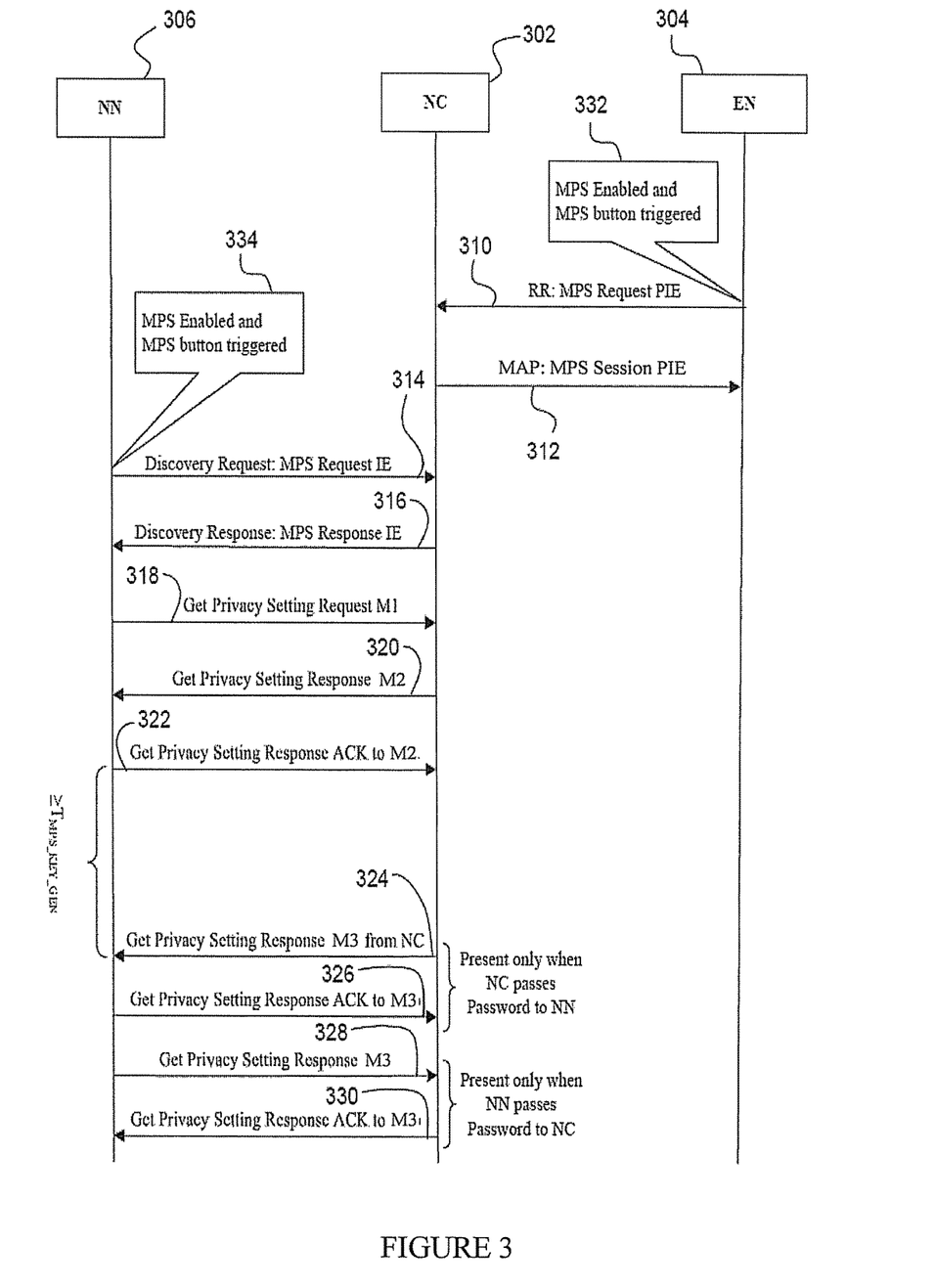
FIG. 3 shows example message exchange sequences, in accordance with various aspects of the present disclosure.

FIG. 3 shows example message exchange sequences (e.g., between nodes of a network and/or nodes to be part of a network), in accordance with various aspects of the present disclosure. For example, FIG. 3 provides an illustration of various functions and tasks performed by a node when operating in each of the three example roles (e.g., NN, EN and NC). Note that in FIG. 3, as an initial condition, a network has already been formed by an NC 302 and an EN 304. The diagram of FIG. 3 shows time flowing from the top of the diagram to the bottom, with horizontal arrows 310-330, that are closer to the top of the diagram depicting communications that occur before communications depicted by arrows that are closer to the bottom of the diagram. Furthermore, the horizontal arrows indicate a communication in the direction of the arrow between nodes 302, 304, and 306.

The first event shown is a user pressing an MPS button 332 on the EN 304 with MPS enabled (e.g., the $MPS_{EN}$ parameter of the EN 304 is set to ENABLE). The user pressing the MPS button results in an MPS Request Protocol Information Element (PIE) being sent within a Reservation Request (RR) 310. In an example implementation, the RR conforms to reservation requests sent in accordance with the MoCA standard, but the scope of various aspects of this disclosure is not limited thereto. TABLE 1 shows an example format of the MPS Request PIE.

TABLE 1

MPS Request PIE Format

| Field | Length | Explanation |
|---|---|---|
| FRAME_SUBTYPE | 4 bits | 0x6 - MoCA 2 Operation |
| FRAME_TYPE | 4 bits | 0x7 - Protocol IE |
| IE_LENGTH | 6 bits | =0 |
| RESERVED | 2 bits | Type III |
| Protocol IE Payload | | |
| TYPE | 4 bits | 0xTBD - MPS Request from an EN |
| RESERVED | 12 bits | Type III |

Note that "0x" indicates that the value that follows is in hexadecimal format. Accordingly, the value 0x6 is equal to 0110 in binary format; the value 0x7 is equal to 0111 in binary format, etc. TBD indicates that the value is yet to be determined. Any value that is not already assigned may be used. Furthermore, it should be understood that each of the fields can be assigned to any value that is not previously been assigned to another function.

In response to the MPS request PIE 310, the processor 202 within the NC 302 checks the status of the parameter $PB_{State}$. For the sake of brevity, throughout this disclosure it should be assumed that when functions are disclosed as being performed by a node, the processor 202 within the node, for example alone or in conjunction with other circuitry, is responsible for actually performing the function (e.g., data analysis function, decision function, data determining function, transmitting and/or receiving control function, etc.).

If the value of the parameter $PB_{State}$ is CLEAR, the NC 302 updates the value to PUSHED. In addition, the NC 302 sets the parameter $PB_{Node}$ to the Node ID of the EN 304 that sent the MPS Request PIE 310. In an example implementation, the Node ID of the EN 304 is included in the RR sent by the EN 304. The NC 302 also starts a timer. In the next MAP 312 to be transmitted by the NC 302, the NC 302 includes a Network MPS Session Protocol IE with the parameter CODE set to 0x0 and the parameter REQUESTING_NODE_ID set to the value of the parameter $PB_{Node}$. TABLE 2 shows an example format of the MPS Response PIE.

TABLE 2

Network MPS Session PIE format

| Field | Length | Explanation |
|---|---|---|
| FRAME_SUBTYPE | 4 bits | 0x6 - MoCA 2 Operation |
| FRAME_TYPE | 4 bits | 0x7 - Protocol IE |
| IE_LENGTH | 6 bits | =0 |
| RESERVED | 2 bits | Type III |
| Protocol IE Payload | | |
| TYPE | 4 bits | 0xTBD - Network MPS Session |
| CODE | 4 bits | 0x0 - Network MPS session start. |
| | | 0x1 - Network MPS session stop. |
| | | Other values reserved. |
| REQUESTING_NODE_ID | 8 bits | The ID of the Node that the response is responding to |

Alternatively, if the value of the parameter $PB_{Node}$ is PUSHED, then the NC 302 checks whether the value of the parameter $PB_{Node}$ is equal to the value of the Node ID of the EN 304. If so, then the NC 302 had previously received a MPS request from this EN 302. Accordingly, the NC 302 will ignore the received MPS request. However, an example implementation, if the value of $PB_{Node}$ is different from the Node ID of the EN 304 (e.g., the node sending the MPS request), then the NC 302 resets the walk timer and sets the value of the parameter $PB_{State}$ to CLEAR. Accordingly, if a user triggers more than one EN, the second EN will cause the MPS session to end. A new session will only occur if the user activates a third trigger. The NC ends the session by sending a PIE with CODE equal to 0x1 in the next MAP after the second trigger from a different EN.

If the walk timer expires (runs for longer than the allotted time) before the NC 302 receives a Pre-Admission Discovery Request from an NN 306, then the NC 302 sets the parameter $PB_{State}$ to CLEAR and resets the walk timer. In addition, the NC 302 sends a MPS Session Protocol IE having the field CODE set to 0x1 in the next MAP.

If the user triggers the NN 306 and the $MPS_{EN}$ of the NN is ENABLED 334, the NN 306 will send a Pre-Admission Discovery Request containing an MPS Request IE 314. TABLE 3 shows an example format of the MPS Request IE 314.

TABLE 3

MPS Request Network IE Format

| Field | Length | Value |
|---|---|---|
| IE Header | | |
| TYPE | 8 bits | 0x08- MPS Request Network IE |
| LENGTH | 8 bits | 0x02 |
| IE Payload | | |
| RESERVED | 12 bits | Type III |
| MPS_PARAMETERS | 4 bits | Bit 3 - Reserved |
| | | Bit 2 - Privacy. reflects the value of ActivePrivacyEN |
| | | 0b0 = Disabled |
| | | 0b1 = Enabled |
| | | Bit 1 - Receive Privacy. If PairedState = unPaired: reflects the value of the Node's $MPS_{PRIVACY\_RECEIVE}$ |
| | | 0b0 = Disabled |
| | | 0b1 = Enabled |
| | | Is set to 0b0 if the PairedState = Paired. |
| | | Bit 0 = Downgrade Privacy. If Bit 1 is set to 0b1: reflects the value of the Node's $MPS_{PRIVACY\_DOWN}$ |
| | | 0b0 = Disabled |
| | | 0b1 = Enabled |
| | | Reserved Type III when Bit 1 = 0b0. |
| GUID | 64 bits | 64 bit MAC address of the device |

In response to the Discovery Request 314, the NC 302 schedules an Admission Control Frame (ACF) slot in the next beacon during which the NC 320 transmits a Pre-Admission Discovery Response with an MPS Response IE 316 to the NN 302. TABLE 4 shows an example format of the MPS Response IE 316.

TABLE 4

MPS Response Network IE Format

| Field | Length | Value |
|---|---|---|
| IE Header | | |
| TYPE | 8 bits | 0x09- MPS Response Network IE |
| LENGTH | 8 bits | 0x02 |
| IE Payload | | |
| NODE_ID | 8 bits | The ID of the NC |
| CODE | 4 bits | 0x0 - MPS is disabled or not triggered. |
| | | 0x1 - Network MPS is triggered. |
| | | Other values reserved. |
| MPS_PARAMETERS | 4 bits | When CODE = 0x1: |
| | | Bit 3 - Reserved |
| | | Bit 2 - Privacy |
| | | 0b0 = Disabled |
| | | 0b1 = Enabled |
| | | Bit 1 - Receive Privacy |
| | | 0b0 = Disabled |
| | | 0b1 = Enabled |
| | | Bit 0 = Downgrade Privacy |
| | | 0b0 = Disabled |
| | | 0b1 = Enabled |
| | | Reserved Type III when Bit 1 = 0b0. |
| | | Otherwise: Reserved Type III |
| REQUESTING_NODE_GUID | 64 bits | This field is copied from the MPS Request Network IE that this response is responding to. |

In the following example, the NC 302 sets the CODE field to 0x1, since the $PB_{State}$ of the NC is PUSHED. It should be noted that the $PB_{State}$ was set to PUSHED in response to the NC 302 receiving the RR 310 from the EN indicating that the EN was triggered. Alternatively, the $PB_{State}$ is set to PUSHED if the NC is locally triggered. When the CODE field of the MPS Response IE 316 is set to 0x1 (e.g., when the NC 302 has either been triggered itself or has received a MPS request PIE indicating that an EN 304 has been triggered) the NC 302 resets the walk timer. In addition, the status of three MPS Parameters is provided in the MPS Response IE 316. The three MPS Parameters are (1) Privacy; (2) Receive Privacy; and (3) Downgrade Privacy. The values of these three MPS Parameters within the NN (transmitted to the NC 302 in the MPS Request IE 314), taken together with the values of the MPS Parameters within the NC 302, determine whether, and how, the nodes will exchange passwords. However, if the NC is in a network, the Privacy parameter will indicate whether the network has privacy enabled or disabled. In this example case, Receive Privacy and Downgrade Privacy will be set to DISABLE.

These three parameters may, for example, indicate the privacy status of the node. It should be understood that when a node is operating as the NC of a network (e.g., there is at least one other EN in the network) and MPS is ENABLED, the node is considered to be "PAIRED". Accordingly, the node maintains a parameter PairedState set to PAIRED. When a node is PAIRED, privacy of the node is set to the privacy of the network. In addition, no change to the node privacy can occur. More generally, a Node is be considered PAIRED if it either formed or joined a network (completed admission) at any time since the last time its state was set to unPaired. Once the parameter PairedState is set to PAIRED, the parameter remains in this state until the management entity resets the nodes MPS using $MPS_{RESET}$. If the management entity resets PairedState to UNPAIRED, the node should update the parameter immediately, even if the node is currently in a network. The parameter should remain the UNPAIRED state until the node drops off the network.

The first of the three parameters indicates whether the node requires privacy. If an NN 306 requires privacy, then the NN 306 can only join a network if the network has privacy enabled. However, the third parameter (Downgrade Privacy), when enabled, allows the NN to enter a network for which privacy is disabled. By allowing an NN to downgrade its privacy, the user can add the NN to the network without having to know the network password. Rather, the user relies on the MPS procedure to ensure that the NN is entering a network of which the user approves.

The second of the three parameters is Receive Privacy. When enabled, this parameter allows a node to receive the network password from another node. In addition, when enabled, the node state of the ActivePrivacyEN can be changed during the MPS process. It should be understood that when a node is operating as the NC of a network (e.g., there is at least one other EN in the network), the password is determined on a network wide basis. Therefore, the NC 302 of a previously formed network cannot receive a password from another node. For example, once the password for a network has been established, it cannot be changed by an incoming NN. Accordingly, Receive Privacy is always set to DISABLED when a node is admitted into a network (e.g., once the PairedStatus is set to PAIRED).

TABLE 5 provides an example MPS decision matrix that indicates the action to be taken by the network nodes 302, 304, 306, in accordance with various aspects of the present disclosure. These actions are based on the values of the MPS Parameters sent by the NC 302 in the MPS Response IE 316 and the MPS Parameters sent by the NN 306 in the MPS Request IE 314.

TABLE 5

MPS Decision Matrix

| MPS_PARAMETERS Sent by NC | | | MPS_PARAMETERS Sent by NN | | | |
|---|---|---|---|---|---|---|
| Bit 2 (Privacy) | Bit 1 (Receive Privacy) | Bit 0 (Downgrade Privacy) | Bit 2 (Privacy) | Bit 1 (Receive Privacy) | Bit 0 (Downgrade Privacy) | Decision |
| DISABLED | N/A | N/A | DISABLED | N/A | N/A | Node Privacy Admission |
| DISABLED | DISABLED | N/A | ENABLED | DISABLED | N/A | FAILED |
| DISABLED | DISABLED | N/A | ENABLED | ENABLED | DISABLED | FAILED |
| DISABLED | DISABLED | N/A | ENABLED | ENABLED | ENABLED | NC: Node Privacy Admission, NN: No Privacy Admission |
| N/A | ENABLED | N/A | ENABLED | DISABLED | N/A | NN to NC PSWD Exchange |
| DISABLED | ENABLED | N/A | ENABLED | N/A | N/A | NN to NC PSWD Exchange |
| ENABLED | DISABLED | N/A | DISABLED | DISABLED | N/A | FAILED |
| ENABLED | DISABLED | N/A | ENABLED | DISABLED | N/A | Node Privacy Admission |
| ENABLED | N/A | N/A | N/A | ENABLED | N/A | NC to NN PSWD Exchange |
| ENABLED | ENABLED | DISABLED | DISABLED | DISABLED | N/A | FAILED |
| ENABLED | ENABLED | ENABLED | DISABLED | DISABLED | N/A | NC: No Privacy Admission, NN: Node Privacy Admission |
| ENABLED | ENABLED | ENABLED | ENABLED | DISABLED | N/A | NN to NC PSWD Exchange |

There are six possible decisions in the example MPS Decision Matrix of TABLE 5. The first is that the NC sends a password to the NN (e.g., a password exchange from NC to NN). This occurs when the NC Privacy is ENABLED and the NN Receive Privacy is ENABLED. For example, when the NC has privacy enabled, it sends its password and the NN can receive the password when NN Receive Privacy is ENABLED. In this case, none of the other MPS Parameters matter.

The second decision is an NN to NC password exchange. In this case, Privacy in the NN 306 is ENABLED and Receive Privacy is ENABLED in the NC 302. Additionally, either the NN Receive Privacy is DISABLED or the NC Privacy is DISABLED. Alternatively, this will occur if all three parameters sent by the NC 302 are set to ENABLE, Privacy in the NN 306 is set to ENABLE and Privacy Receive in the NN is set to DISABLE. For example, if an exchange from the NC to NN can occur, that exchange is favored over an NN to NC exchange. Therefore, if the NC Privacy is ENABLED and the NN Privacy Receive is ENABLED, the status of the NN Privacy and the NC Privacy Receive do not matter. In each other case in which the NN Privacy is ENABLED and the NC Privacy Receive is ENABLED, a password exchange from the NN to the NC will take place. It should be noted that the NC will only have Privacy Receive set to ENABLED when the NC is in beacon phase and the PairedStatus is set to UNPAIRED. Once the PairedStatus is set to PAIRED, the Privacy Receive state is set to DISABLED, since a paired node cannot change its password.

The third decision is Node Privacy Admission. In this case, no password exchange occurs, but the admission process takes place using the NN's and NC's ActivePrivacyEN and ActivePSWD settings. In one case, both the NC 302 and the NN 306 have Privacy DISABLED. Therefore, there is no need to exchange security information. In an alternative case, Privacy is ENABLED in both NC and the NN, but Receive Privacy is DISABLED in both, so no downgrade is possible. None the less, since the Privacy in both the NC and NN agree, the admission process can go forward without a password exchange.

The fourth decision is NC: No Privacy Admission/NN: Node Privacy Admission. In this case, Privacy is ENABLED in the NC, but the Downgrade Privacy parameter in the NC 302 is also ENABLED, allowing the NC to downgrade its privacy to operate with an NN that has Privacy DISABLED and Receive Privacy set to DISABLED. Therefore, the NC ActivePrivacyEN parameter is set to DISABLED, while the $PRIVACY_{EN}$ parameter remains ENABLED. It should be noted that each node has both an ActivePrivacyEN parameter and a $PRIVACY_{EN}$ parameter. The ActivePrivacyEN parameter can be changed through the MPS process if MPS $Privacy_{down}$ parameter is ENABLED. In addition, Active-$Privacy_{EN}$ can change from DISABLED to ENABLED if Privacy Receive is set to ENABLED.

The fifth decision is similar to the fourth decision. In this case, NN: No Privacy Admission/NC: Node Privacy Admission. This occurs if the NN Privacy is ENABLED, the Downgrade Privacy parameter in the NN 306 is also ENABLED, the NN Receive Privacy is set to ENABLED, the NC Privacy and Receive Privacy are set to DISABLED. Accordingly, the NN can downgrade and set the ActivePrivacyEN parameter to DISABLED, thereby allowing the admission process to go forward with an NC that has privacy set to DISABLED.

It should be noted that Node Privacy Admission does not require a downgrade in the state of the ActivePrivacyEN. In contrast, No Privacy Admission occurs when a downgrade to the privacy is necessary, thus setting the value of ActivePrivacyEN to DISABLED while the value of $PRIVACY_{EN}$ remains ENABLED.

The sixth decision is FAILED. There are four instances in the Matrix of TABLE 5 when the MPS admission process will fail. In the first instance, both the Privacy and Receive Privacy parameters in the NC 302 are DISABLED. In addition, the Privacy Parameter in the NN is ENABLED and the status of Receive Privacy is set to DISABLED. Because the state of Receive Privacy in the NN is DISABLED, the NN cannot downgrade the Privacy. Therefore, it is not possible for the NN to complete the admission process.

In the second instance, both the NC Privacy and Receive Privacy parameters are DISABLED. However, Privacy is set to ENABLED in the NN. The Receive Privacy in the NN is set to ENABLED, but downgrade is DISABLED in the NN. Therefore, the NN cannot complete the admission process.

In the third instance, the MPS parameters sent by the NC has Privacy set to ENABLED and Receive Privacy set to DISABLED. The NN has Privacy set to DISABLED, and Receive Privacy set to DISABLED, therefore, the NN cannot complete the admission process. The Receive Privacy in the NN is set to DISABLED, therefore no downgrade is possible.

In the fourth instance, the MPS parameters sent by the NC has Privacy set to ENABLED and Receive Privacy set to ENABLED, but Downgrade Privacy is set to DISABLED. The NN has Privacy set to DISABLED and Receive Privacy set to DISABLED. Therefore, as noted above, the NN cannot change its Privacy setting to enter the secure network.

Looking once again at FIG. 3, after sending the MPS Response IE 316, if the decision from TABLE 5 indicates that a password exchange is to take place, the NC 302 schedules an ACF slot in the next beacon with the ACF_TYPE field set to 0x0F and the ADDITIONAL_ACF-TYPE field set to 0x20. The NC 302 then waits to receive a Get Privacy Setting Request M1 message 318 from the NN 306 in the ACF slot. If, for any reason, the password exchange is not completed successfully, both the NC 302 and the NN 306 set the $PB_{State}$ to CLEAR, the NC 302 sends a Network MPS Session Protocol IE in a MAP with CODE set to 0x1 ending the MPS session. The NC 302 then resumes normal operation. The NN 306 should then, for example, continue searching for a network.

The format of an example Get Privacy Setting Request M1 message 318 is provided in TABLE 6.

TABLE 6

Get Privacy Setting Request M1 Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x7 - Get Privacy Setting Request M1 |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | The total length of the MPDU frame body in bytes (excluding the MPDU header). |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |
| Frame Payload | | |
| DH_M1 | 1664 bits | N1 ∥ $PK_{NN}$, where N1 and $PK_{NN}$ where $PK_{NN}$ Diffie-Hellman Public Key of the NN and N1: a 128-bit secret random number (nonce) generated by the NN |
| GUID | 64 bits | 64 bit MAC address of the requesting node |
| Payload FCS | | |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

If the NC 302 does not receive the Get Privacy Setting Request M1 message 318 from the NN, it will schedule in the next Beacon an ACF slot with ACF_TYPE=0x0F and ADDITIONAL_ACF_TYPE=0x02 and retransmit the Pre-Admission Discovery Response with the MPS Response Network IE 316 in the ACF slot. In the following Beacon the NC 302 will then schedule another ACF slot for the Get Privacy Setting Request M1 message 318 from the NN 306. The NC 302 will repeat the retransmission of the MPS Response 316 and rescheduling of the Get Privacy Setting Request M1 message 318 until it either receives the Get Privacy Setting Request M1 message 318 from the NN 306 or it completed a predetermined number of repetitions. If, after the predetermined number of repetitions, the NC 302 does not receive the Get Privacy Setting Request M1 message 318, the NC 302 will abort the MPS password exchange.

Upon reception of Get Privacy Setting Request M1 message 318, the NC 302 schedules an ACF slot with ACF_TYPE=0x0F and ADDITIONAL_ACF_TYPE=0x21 and transmit a Get Privacy Setting Response M2 message 320 to the NN 306. The format of an example Get Privacy Setting Response M2 message 320 is given by TABLE 7.

TABLE 7

Get Privacy Setting Response M2 Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x8 - Get Privacy Setting Response M2 |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |
| Frame Payload | | |
| DH_M2 | 1664 bits | N2∥ $PK_{NC}$, where N2 and $PK_{NC}$ where $PK_{NC}$: Diffie-Hellman Public Key of the NC and N2: a 128-bit secret random number (nonce) generated by the NC. |
| Payload FCS | | |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

After transmitting the Get Privacy Setting Response M2 message 320, the NC 302 schedules in the next Beacon an ACF slot with ACF_TYPE=0x0F and ADDITIONAL_ACF_TYPE=0x22. The NN 306 then acknowledges the reception of M2 Response message 320 by sending a Get Privacy Setting Response ACK message 322. The format of an example ACK message 322 is shown in TABLE 8.

TABLE 8

Get Privacy Setting Response Ack Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0xA - Get Privacy Setting Response Ack |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |

TABLE 8-continued

Get Privacy Setting Response Ack Message Format

| Field | Length | Usage |
|---|---|---|
| PACKET_LENGTH | 16 bits | The total length of the MPDU frame body in bytes (excluding the MPDU header). |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |
| Frame Payload | | |
| RESERVED | 31 bits | Type III |
| Payload FCS | | |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

If the NC 302 does not receive the Get Privacy Setting Response ACK 322 from the NN 306, it schedules in the next Beacon an ACF slot with ACF_TYPE=0x0F and ADDITIONAL_ACF_TYPE=0x21 and retransmits Get Privacy Setting Request M2 message 320 in the ACF slot. In the following Beacon the NC 302 schedules another ACF slot for the Get Privacy Setting Response ACK 322 from the NN 306. The NC repeats the retransmission of the Get Privacy Setting Request M2 message 320 and reschedules the Get Privacy Setting Response ACK 322 until it either receives the ACK 322 from the NN 306 or it completed a predetermined number of repetitions. If, after the predetermined number of repetitions, the NC 302 doesn't receive the ACK 322, the NC 302 aborts the MPS password exchange.

If the Decision from TABLE 5 is to perform an NC to NN password exchange, then upon receiving the Get Privacy Setting Response ACK message 322, the NC 302 transmits a Get Privacy Setting Response M3 message 324 to the NN 306 at least a predetermined time (e.g., in an example implementation, equal to a parameter $T_{MPS\_KEY\_GEN}$) after the NC 302 receives the ACK message 322. The Get Privacy Setting Response M3 message 324 is transmitted in an ACF slot with ACF_TYPE=0x0F and ADDITIONAL_ACF_TYPE=0x23. An example format of the message is given by TABLE 9.

TABLE 9

Get Privacy Setting Response M3 Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x9 - Get Privacy Setting Response M3 |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |

TABLE 9-continued

Get Privacy Setting Response M3 Message Format

| Field | Length | Usage |
|---|---|---|
| | | Frame Payload |
| DH_M3 | 328 bits | IV‖ $ENC_{MPSKey}$(Password)‖ $HMAC_{DHKey}$(M1‖M2‖DH_M3*)(M1‖M2‖DH_M3*) where IV is a constant string (32 replications of 0xA concatenated), $ENC_{MPSKey}$(Password) is the encrypted Password which is calculated, and DH_M3*(=IV ‖ $ENC_{MPSKey}$(Password)) is the authenticator attribute. |
| RESERVED | 8 bits | Type III Payload FCS |
| PAYLOAD_FCS | 32 bits | For all the Management and Control MPDUs, and for the Ethernet data packet, the 32-bit FCS is calculated using CRC-32-IEEE 802.3 ($x^{32}$ + $x^{26}$ + $x^{23}$ + $x^{22}$ + $x^{16}$ + $x^{12}$ + $x^{11}$ + $x^{10}$ + $x^8$ + $x^7$ + $x^5$ + $x^4$ + $x^2$ + $x$ + 1). For the A_PDU sub-header the 16-bit FCS is calculated using the CRC-16 ($x^{16}$ + $x^{15}$ + $x^2$ + 1), the same as for the MPDU header FCS. |

After transmitting the Get Privacy Setting Response M3 message 324, the NC 302 schedules in the next Beacon an ACF slot with ACF_TYPE=0x0F and ADDITIONAL_ACF_TYPE=0x22. The NN 306 acknowledges the reception of M3 message 324 by sending a Get Privacy Setting Response ACK message 326. The format of the ACK message 326 is shown in TABLE 9.

ACTIVE_PSWD=the new password to the management entity and ACTIVE_PRIVACY$_{EN}$=Enabled if PRIVACY$_{EN}$ is configured as DISABLED by the management entity.

If the NC 302 does not receive the Get Privacy Setting Response ACK 326 from the NN 306, the NC 302 schedules in the next Beacon an ACF slot with ACF_TYPE=0x0F and ADDITIONAL_ACF_TYPE=0x21 and retransmit Get Pri-

TABLE 10

Get Privacy Setting Response Ack Message Format

| Field | Length | Usage |
|---|---|---|
| | | MPDU Header |
| TRANSMIT_CLOCK | 32 bits | This value is the scheduled time derived from the corresponding AU in the MAP. |
| PACKET_SUBTYPE | 4 bits | 0xA - Get Privacy Setting Response Ack |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16}$ + $x^{15}$ + $x^2$ + 1). |
| | | Frame Payload |
| RESERVED | 31 bits | Type III Payload FCS |
| PAYLOAD_FCS | 32 bits | For all the Management and Control MPDUs, and for the Ethernet data packet, the 32-bit FCS is calculated using CRC-32-IEEE 802.3 ($x^{32}$ + $x^{26}$ + $x^{23}$ + $x^{22}$ + $x^{16}$ + $x^{12}$ + $x^{11}$ + $x^{10}$ + $x^8$ + $x^7$ + $x^5$ + $x^4$ + $x^2$ + $x$ + 1). For the A_PDU sub-header the 16-bit FCS is calculated using the CRC-16 ($x^{16}$ + $x^{15}$ + $x^2$ + 1), the same as for the MPDU header FCS. |

The NN 306 uses the new password it received from the NC 302 for network admission. The NN 306 also reports vacy Setting Request M3 324 message in the ACF slot. In the following beacon, the NC 302 schedules another ACF slot for the Get Privacy Setting Response ACK 326 from the NN. The NC 302 repeats the retransmission of the Get Privacy Setting Request M3 message and reschedules of the Get Privacy Setting Response ACK 326 until it either receives the ACK 326 from the NN 306 or it completed a predetermined number of repetitions. If after the predetermined number of repetitions the NC 302 doesn't receive the ACK 326, the NC 302 aborts the MPS password exchange.

If the Decision of TABLE 5 is to perform an NN to NC password exchange, than upon receiving the Get Privacy Setting Response ACK message 322, the NC 302 schedules an ACF slot with ACF_TYPE=0x0F and ADDITIONAL_ACF_TYPE=0x24. In accordance with an example implementation, the slot is scheduled for at least a value indicated by a variable TMPS_KEY_GEN after the NC 302 receives the ACK message 322. The NN 306 transmits a Get Privacy Setting Response M3 message 328 in the scheduled ACF slot. The format of the Get Privacy Setting Response M3 message 328 is shown in TABLE 9.

If the NC 302 does not receive the Get Privacy Setting Response M3 message 328 from the NN 306, the NC 302 schedules another ACF slot for the M3 message from the NN 306 in the next Beacon. If, after rescheduling the Get Privacy Setting Response M3 328 a predetermined number of times, the NC 302 does not receive the M3 message from the NN 306, the NC 302 aborts the MPS password exchange.

After receiving the Get Privacy Setting Request M3 message 328, the NC 302 transmits a Get Privacy Setting Response ACK 330 in the next ACF slot with ACF_TYPE=0x0F and ADDITIONAL_ACF_TYPE=0x25 to acknowledge the reception of M3 message 328. The format of the ACK message 330 is shown in TABLE 10. The NC 302 then starts to use the new Privacy setting for network admission. The NC 302 also reports ACTIVE_PSWD=the new password to the management entity and ACTIVE_PRIVACY$_{EN}$=Enabled if PRIVACY$_{EN}$ is configured as DISABLED by the management entity.

Various example messages discussed herein may comprise Diffie-Hellman security information, non-limiting examples of which are presented herein. It should be noted that any of a variety of alternative types of security information may be communicated without departing from the scope of this disclosure.

In accordance with an example implementation, the following parameters and notations are defined for the Diffie-Hellman Exchange:

"A" is a secret number randomly selected by NN.
"B" is a secret number randomly selected by the NC.
"g" is a generator for the Diffie-Hellman exchange. The value g is known to the public.
"P" is a prime for the Diffie-Hellman exchange. The value of P is known to the public.
"N1" is a 128-bit secret random number ("nonce") generated by the NN.
"N2" is a 128-bit secret random number ("nonce") generated by the NC.
"PK$_{NN}$" is a Diffie-Hellman Public Key of the NN.
"PK$_{NC}$" is a Diffie-Hellman Public Key of the NC.
"DHKey" is a Diffie-Hellman Shared Key.
"MPSKey" is an authentication key derived from DHKey, the nonces N1 and N2, and the NN's MAC address.
"||" denotes a concatenation operation.

In an example implementation in which the nodes are MoCA nodes operating in accordance with MoCA 2.1, the MPS operation uses 1536-bit Modular Exponential (MODP) Group for Diffie-Hellman Exchange.

The prime n p is: $2^{1536}-2^{1472}-1+2^{64}*\{[2^{1406} pi]+741804\}$. Its hexadecimal value is:

| | | | | | |
|---|---|---|---|---|---|
| FFFFFFFF | FFFFFFFF | C90FDAA2 | 2168C234 | C4C6628B | 80DC1CD1 |
| 29024E08 | 8A67CC74 | 020BBEA6 | 3B139B22 | 514A0879 | 8E3404DD |
| EF9519B3 | CD3A431B | 302B0A6D | F25F1437 | 4FE1356D | 6D51C245 |
| E485B576 | 625E7EC6 | F44C42E9 | A637ED6B | 0BFF5CB6 | F406B7ED |
| EE386BFB | 5A899FA5 | AE9F2411 | 7C4B1FE6 | 49286651 | ECE45B3D |
| C2007CB8 | A163BF05 | 98DA4836 | 1C55D39A | 69163FA8 | FD24CF5F |
| 83655D23 | DCA3AD96 | 1C62F356 | 208552BB | 9ED52907 | 7096966D |
| 670C354E | 4ABC9804 | F1746C08 | CA237327 | FFFFFFFF | FFFFFFFF |

The generator g is 2.

In accordance with an example implementation, the NN and NC randomly generate the secret values A and B, respectively. In one such example implementation, A and B are at least 3072 bits. The Diffie-Hellman Public Keys are calculated as:

PK$_{NN}$=$g^A$ mod p and PK$_{NC}$=$g^B$ mod p.

In an example implementation, the NN and the NC randomly generate the nonces N1 and N2 and exchange their nonces as well as the Diffie Hellman Public Keys. The NN then calculates the Diffie-Hellman Shared Key as:

DHKey=SHA-256(PK$_{NC}^A$ mod p).

The NC calculates the Diffie-Hellman Shared Key as:

DHKey=SHA-256(PK$_{NN}^B$ mod p).

Both the NN and the NC calculate the MPS Key as:

MPS$_{Key}$=the first 128 bits of HMAC-SHA-256(DH-Key,N1||NNMAC||N2), where NNMAC is the 6-byte MAC address of the NN.

In accordance with an example implementation in which the network operates in accordance with MoCA, the Network Password length is 12 to 17 decimal digitals (96~136 bits). In an alternative example implementation, the password may be longer. To encrypt a Password during a MPS session, the sender of the Password first appends zeros to the end of the Password to make it 136 bits and then encrypt it using AES-128 with MPS$_{key}$ as the key.

In summary, various aspects of this disclosure provide systems and methods for securing a network, for admitting new nodes into an existing network, and/or securely forming a new network. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A network comprising:
a first node; and
a second node, wherein:
the first node comprises a user-actuated trigger and at least one circuit operable to, at least:
receive a trigger indication that a user has actuated the user-actuated trigger;
in response to the received trigger indication, send a first message comprising an information element indicating that the first node has been triggered by a user; and
the second node comprises at least one circuit operable to, at least:
receive the first message;
in response to the received first message,
set a local state variable to indicate that the protected set-up session is in progress;
while the protected set-up session is in progress, receive a second message from a third node that is not a member of the network, the second message comprising an information element indicating a plurality of protected set-up parameters, different from encryption information, of the third node; and
determine, based at least in part on protected set-up parameters of the second node and on the protected set-up parameters of the third node, whether to share security information with the third node; and
if it is determined, based at least in part on protected set-up parameters of the second node and on the protected set-up parameters of the third node, to share security information with the third node, then share security information with the third node,
wherein the protected set-up parameters of each node of the second node and the third node comprise:
a first parameter that indicates whether said each node is allowed to receive a network password from another node;
a second parameter that indicates whether privacy is enabled at said each node; and
a third parameter that indicates whether said each node is allowed to accept a privacy downgrade.

2. The network of claim 1, wherein each of the first, second, and third parameters is a single-bit parameter.

3. The network of claim 1, wherein the first message is a reservation request message, and the second message is a discovery request message communicated prior to the communication of encryption information from the third node.

4. A network node, the node comprising:
at least one circuit operable to, at least:
receive a first message from a first other node that is a member of a network, the first message comprising an information element indicating that the first other node has been triggered by a user;
in response to the received first message
set a local state variable to indicate that the protected set-up session is in progress;
while the protected set-up session is in progress, receive a second message from a second other node that is not a member of the network, the second message comprising an information element indicating a plurality of protected set-up parameters, different from encryption information, of the second other node; and
determine, based at least in part on protected set-up parameters of the node and on the protected set-up parameters of the second other node, whether to share security information with the second other node; and
if it is determined, based at least in part on protected set-up parameters of the node and on the protected set-up parameters of the second other node, to share security information with the second other node, then share security information with the second other node,
wherein the protected set-up parameters of each node of the node and the second other node comprise:
a first parameter indicating whether said each node is allowed to receive a network password from another node;
a second parameter indicating whether privacy is enabled at said each node; and
a third parameter indicating whether said each node is allowed to accept a privacy downgrade.

5. The node of claim 4, wherein the at least one circuit is operable to, in response to the received second message and prior to encryption key information being exchanged between the second other node and the node, transmit a third message to the second other node comprising information indicating that a protected set-up session is in progress.

6. The node of claim 4, wherein the first message is a reservation request message.

7. The node of claim 6, wherein the second message is a discovery request message.

8. The node of claim 4, wherein the first message is a reservation request message, the second message is a discovery request message, and the third message is a discovery response message, wherein the first, second, and third messages are communicated prior to the node sending encrypted information to the second other node.

9. The node of claim 4, wherein the at least one circuit is operable to, in response to the received first message:
set a timer; and
if the timer expires before the second message is received, then cancel the protected set-up session.

10. The node of claim 4, wherein the at least one circuit is operable to, in response to the received first message, determine whether a protected set-up session is already in progress.

11. The node of claim 10, wherein the at least one circuit is operable to, if it is determined that a protected set-up session is already in progress, then:
determine if the first other node initiated the protected set-up session that is already in progress; and
if it is determined that the first other node initiated the protected set-up session that is already in progress, then ignore the received first message.

12. The node of claim 11, wherein the at least one circuit is operable to, if it is determined that a protected set-up session is already in progress, then:
if it is determined that the first other node did not initiate the protected set-up session that is already in progress, then cancel the protected set-up session that is already in progress.

13. The node of claim 4, wherein the first parameter is a one-bit parameter.

14. The node of claim 4, wherein the second parameter is a one-bit parameter.

15. The node of claim 4, wherein the third parameter is a one-bit parameter.

16. The node of claim 4, wherein the at least one circuit is operable to, if it is determined to share security information with the second other node, then determine whether to send password information to the second other node or whether to receive password information from the second other node.

\* \* \* \* \*